United States Patent

Beck, Jr.

[15] 3,703,758

[45] Nov. 28, 1972

[54] APPARATUS FOR SECURING AN ELONGATED METAL MEMBER TO A FLAT METAL SHEET

[72] Inventor: Edward G. Beck, Jr., Fort Thomas, Ky.

[73] Assignee: Airtex Corporation, Chicago, Ill.

[22] Filed: March 9, 1970

[21] Appl. No.: 17,566

Related U.S. Application Data

[60] Division of Ser. No. 673,138, Oct. 5, 1967, Pat. No. 3,514,834, which is a continuation-in-part of Ser. No. 523,619, Jan. 28, 1966.

[52] U.S. Cl............29/202, 29/157.3 A, 29/487, 29/493, 228/44, 228/46
[51] Int. Cl. ..............................B23p 15/16
[58] Field of Search .....29/202 R, 157.3 A, 487, 493; 228/4, 44, 46

[56] References Cited

UNITED STATES PATENTS

| | | | |
|---|---|---|---|
| 2,332,368 | 10/1943 | Burtenshaw | 29/487 |
| 3,102,330 | 9/1963 | Kritzer | 29/202 R |
| 3,114,963 | 12/1963 | Kritzer | 29/202 R |
| 3,151,591 | 10/1964 | Burns et al | 29/493 |
| 3,190,524 | 6/1965 | Ulam | 228/4 |

Primary Examiner—John F. Campbell
Assistant Examiner—R. J. Craig
Attorney—Melville, Strasser, Foster & Hoffman

[57] ABSTRACT

A method of securing metallic tubing and the like to a flat metal sheet while maintaining the flatness of the sheet so that the composite tube and sheet may be used as radiant heating or cooling panels in building interiors where distortion or wrinkling of the flat sheet would be undesirable. The apparatus comprises a heating station where a composite of sheet, of suitably disposed bonding material, and a piece of tubing in properly assembled relationship and under pressure are heated to induce a bond between the tubing and the sheet while maintaining the sheet in flat condition. An assembly station is provided including a jig in which the piece of tubing may be accurately located, means for accurately locating the jig with respect to the sheet, and means for raising and lowering the jig and for releasing the jig from the raising and lowering means so that it may move with the assembly from the assembly station to the heating station. After the heating cycle, the assembly moves to a cooling station (which may be the same as the assembly station) for a cooling cycle. A combined assembly and cooling station may be provided on each side of the heating station, each assembly station having a jig whereby production may be speeded up.

4 Claims, 9 Drawing Figures

PATENTED NOV 28 1972

INVENTOR/S

EDWARD G. BECK, JR.

INVENTOR/S

EDWARD G. BECK, JR.

3,703,758

APPARATUS FOR SECURING AN ELONGATED METAL MEMBER TO A FLAT METAL SHEET

CROSS REFERENCE TO RELATED APPLICATION

This is a division of application Ser. No. 673,138, filed Oct. 5, 1967 now U.S. Pat. No. 3,514,834 granted June 2, 1970. which is a continuation-in-part of application Ser. No. 523,619 filed Jan. 28, 1966 in the name of Edward G. Beck, Jr. and bearing the same title as the present application.

BACKGROUND OF THE INVENTION

The invention relates to the field of radiant heating and cooling panels. In such panels one face of the panel is exposed in the room or other space which is to be heated or cooled. The unexposed face of the panel is provided with tubing through which a heating or a cooling medium may be circulated to heat or cool the panel by which the room is then either cooled or heated by radiation to or from the panel. The invention more specifically relates to an apparatus for producing such composite panels and to a method of achieving a good bond in good heat exchange relationship between the panel and the tubing without destroying the flatness of the sheet.

Prior attempts to bond a tubing to a flat metal sheet for the above described purpose have not been satisfactory. In some cases the heat exchange relationship between the tubing and the plate was not good and in other cases where a good heat exchange relationship was achieved, the panel was distorted so that the configuration of the tubing on the rear face of the panel could be seen on the exposed face of the panel. The appearance of the panel has not been of critical importance in situations where such panels have been used because primarily they have been used in refrigeration evaporators and the like where appearance is not a primary consideration. However, where the radiant panel is to be a wall panel or a ceiling panel in a room in a building, no ripples or undulations in the face of the panel should be apparent even when it is viewed from a very flat angle.

SUMMARY

The invention contemplates, from the method standpoint, providing on the sheet a strip of a bonding material in the region where bond is desired, said bonding material having a lower melting point than the sheet and the tube, then accurately locating the tube in contact with the bonding material, clamping the sheet, over the area which is not occupied by the tube, under a uniform pressure, maintaining the assembled parts accurately in position while heating the assembly of the sheet, bonding material, and tubing to a temperature above the melting point of the bonding material but below the melting point of the sheet and the tubing, and then cooling the assembly at a relatively high temperature but below the hardening point of the bonding material until the bond has been achieved.

From the apparatus standpoint, there is provided preferably a central heating station on each side thereof and in alignment therewith a combined assembly and cooling station. At each of said stations there is provided a flat block of metal having a flat upper surface, and the surfaces of the blocks are in the same horizontal plane. The blocks are of a metal which will not distort at the temperatures encountered at the respective stations. A thin metallic belt of good heat conductivity is disposed to pass over the said three blocks and means are provided to reciprocate said belt backward and forward. At each of the assembly stations means are provided for raising and lowering a jig which is detachably secured to the raising and lowering means. The jig comprises a flat plate of a material which will not distort at the temperatures to which it will be subjected, and has secured to its underside a block of non-metallic material having relatively poor heat conductivity, but sufficient mechanical strength to retain its physical integrity with distortion at the temperatures which will be encountered. The jig will have at least the same dimensions in the horizontal plane as the sheet to which the tubing will be assembled. The underside of the non-metallic block will have one or more grooves of a width sufficient to accommodate the tubing or other member which is to be secured to the sheet, and those grooves will be of a depth greater than the thickness of the member to be secured to the sheet. Within the groove or grooves resilient means are provided which will exert pressure against the member in the groove to urge it against the sheet when the jig is positioned on the sheet.

The bonding material may be a solder either in the form of a ribbon or wires, or in the form of a metallic powder which may be applied to the sheet very accurately by screen printing. The bonding material may also be one of the thermosetting resin adhesives. Means are provided in connection with the jig to insure accurate location of the tubing in the jig so that the tubing will be assembled in accurate relationship to the bonding material disposed on the sheet. Thus, when the jig is lowered into contact with the sheet and disconnected from the lowering device, the belt moves the assembly to the heating station to create the bond, and thereafter the belt moves the assembly to the cooling station which may be at the same point as the assembly station and may, therefore, be provided with means for heating to a temperature below the hardening point of the bonding material.

DESCRIPTION OF THE PREFERRED EMBODIMENTS

Figure 1:
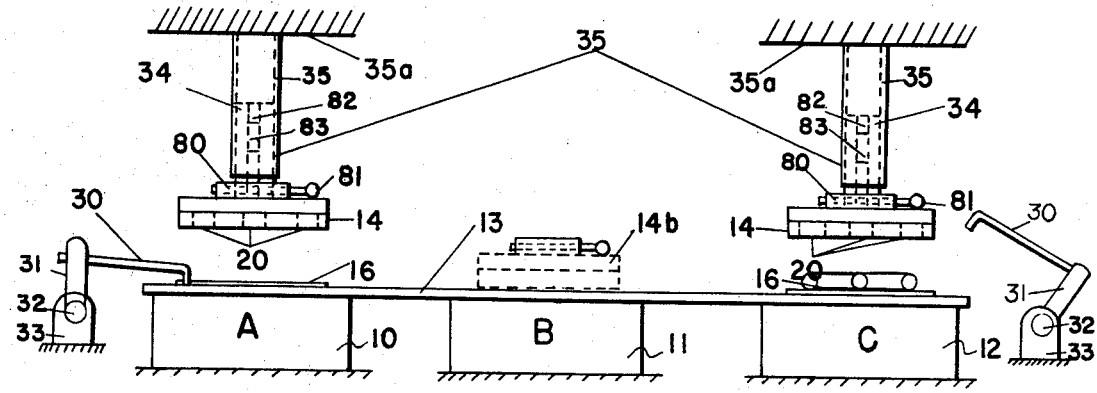
FIG. 1 is a somewhat diagrammatic view in elevation of an apparatus according to the present invention.
Figure 2:
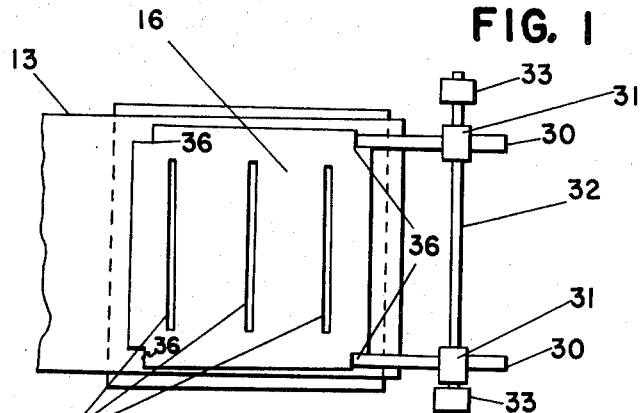
FIG. 2 is a fragmentary plan view of one of the assembly stations.

In FIG. 1 the heating station is indicated at B and assembly and cooling stations are indicated at A and C. At each station there is provided a flat block of uniform thickness with flat top and bottom surfaces, as at 10, 11 and 12. These blocks are of a material which will not have its flatness distorted at temperatures encountered during the operations which will be conducted. While these plates may be an annealed steel, they are preferably made of cast aluminum tooling plate such as manufactured and sold by Aluminum Corporation of America as No. 300 Cast Aluminum Tooling Plate. It will be seen that the upper surfaces of plates 10, 11 and 12 are in a common plane and a belt 13 is arranged to pass over them. The belt 13 must have good heat conductivity and may be of perforated aluminum having a thickness of 0.032 inches. In FIG. 1 an assembly 14b is shown at the heating station in broken lines, while another assembly is being assembled at assembly and cooling station A. At 14c there is shown another assembly which has cooled down and is about to be removed from the assembly and cooling station C.

In order to insure that the tubing or other element to be joined to the sheet is located on the sheet in its proper location, and that the sheet is confined by a uniform pressure over substantially its entire surface, a jig 14 is provided as best seen in FIGS. 3 to 6 inclusive. The jig comprises a plate 17 which is also preferably a cast aluminum tooling plate as described above, and may have a thickness, for example, of one inch. Secured to the plate 17 by means of bolts 18 is a block 19 of a non-metallic material which has relatively poor heat conductivity but sufficient mechanical strength to retain its physical integrity without distortion at soldering, brazing or polymerizing temperatures. By way of example, the block 19 may be made from asbestos fiber and an inorganic binder such as is available from Johns-Manville Corporation under the registered trademark MARANITE. This material has a density of 65 pounds per cubic foot and by way of example the block 19 may have a thickness of one inch.

The underside of the block 19 is provided with the groove or grooves 20. In the particular embodiment shown, the groove is sinuous or S-shaped such that a previously bent piece of tubing 15 may lie in the groove 20. The width of the groove 20 is such as to accommodate comfortably the tubing 15 and its depth is greater than the diameter of the tubing 15. Within the groove 20 means are provided to urge the tubing against the sheet when the jig is laid on the sheet and these means may be a strip 21 of a resilient material which will maintain its resilience at the temperatures encountered as, for example, a silicone rubber compound of 30 durometers. It will be understood that the thickness of the strip 21 is greater than the difference between the diameter of the tube 15 and the depth of the groove 20. Instead of the strip 21, stainless steel spring members may be used. The springs will of course be made of an appropriate alloy which will retain its spring properties at the operating temperatures of the process. They perform the same function as the resilient strip 21.

The tubing 15 is accurately located and held in the jig by means of pressure pins 60. The pins 60 slide in holes in blocks 63 secured to the plate 17 and may be actuated in any desired manner as, for example, by air cylinders, to advance the pins 60 into contact with the tubing, and when air pressure is released the springs 61 will serve to retract the pins 60 out of the way. Preferably the pins engage the tubing centrally of the convex loops as shown in FIG. 3.

Figure 3:
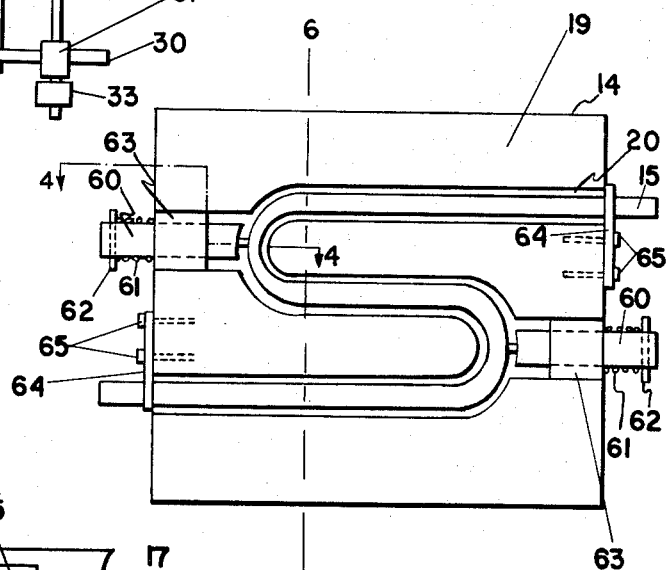
FIG. 3 is a bottom view of the jig.
Figure 4:
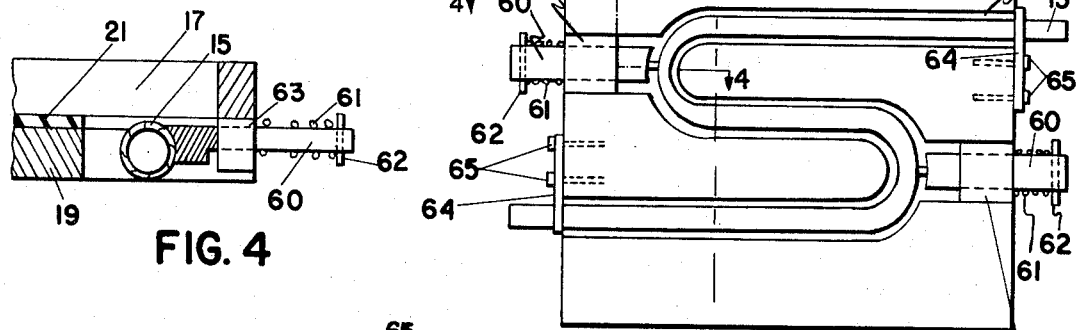
FIG. 4 is a fragmentary cross sectional view taken on the line 4—4 of FIG. 3 but inverted so as to be right side up.
Figure 5:
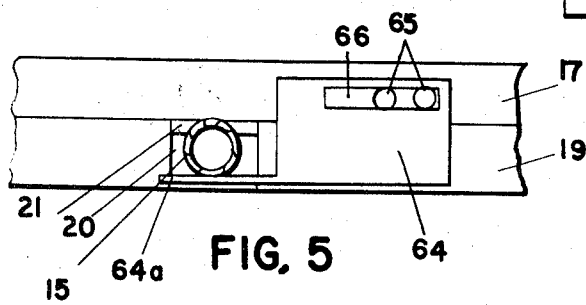
FIG. 5 is a fragmentary elevational view as seen from the right of FIG. 3.
Figure 6:
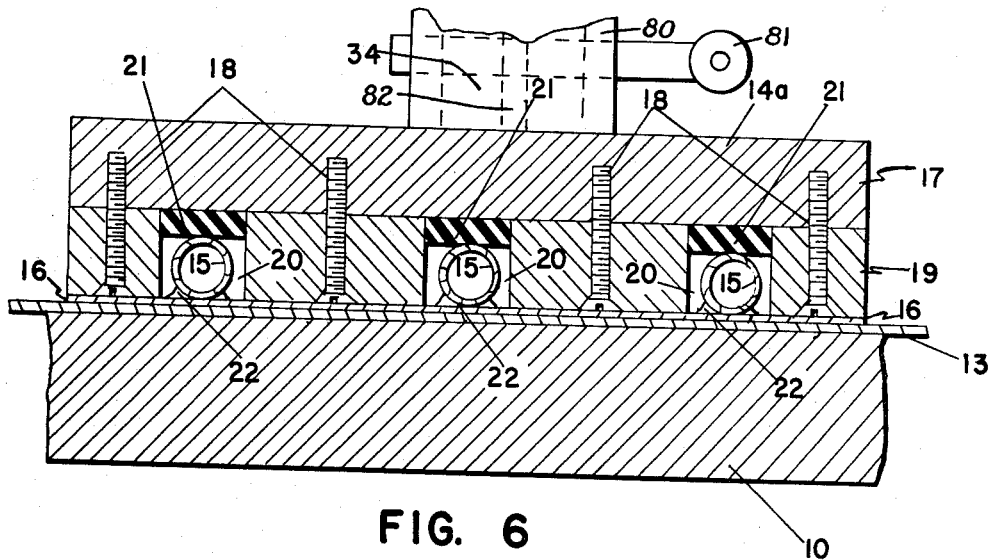
FIG. 6 is a cross sectional view through the assembly of jig, tubing, and sheet as disposed on the belt at the assembly station as seen on the line 6—6 of FIG. 3.

Since FIG. 3 is a bottom view and the jig is actually disposed as seen in FIG. 1, additional means may be provided to prevent the tubing 15 from falling out of the jig. This is accomplished as shown in FIG. 5 by means of the sliding retainers 64. These are simply plates secured to the block 17 by means of bolts 65 passing through a slot 66 so that the plates 64 may be slid back and forth. They are provided with a finger 64a which engages under the ends of the tubing 15 where they emerge from the groove 20.

Each of the jigs 14 is rigidly connected to a shank 34 which is slidable in a guide tube 35 fixedly mounted to a frame member or the like 35a. Means (not shown) are provided to raise and lower the jig 14 and its shank 34 with respect to the guide tube 35; and when the jig 14 has been lowered onto the sheet 16, the jig 14 may be disconnected from the shank 34. It will be observed that the shank 34 fits snugly into a collar 80 rigidly secured to the jig 14, and is releasably secured thereto by a pin 81. The shank fits snugly in the guide tube 35, and is provided with a longitudinal groove 82 which is engaged by a key 83 fastened in the guide tube 35, to prevent rotation of the jig when it is raised. Thus when the pin 81 is withdrawn, the shank 34 may be raised without the jig 14, which remains on the sheet as shown at station B.

Figure 7:
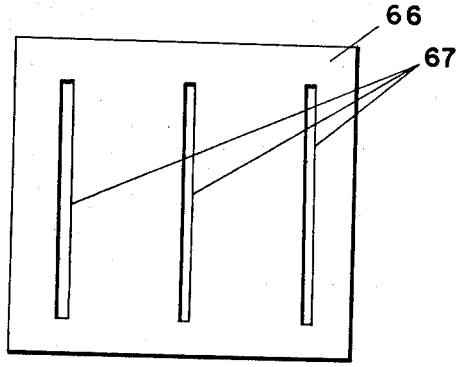
FIG. 7 is a plan view of a template for ensuring the proper location of the bonding material where it is in the form of strips of solder.

The bonding material may be applied to the sheet before the sheet is placed on the assembly block in a number of ways depending upon the material of the bonding agent. If the bonding agent is a ribbon of solder, use may be made of a template 66 as shown in FIG. 7. The template 66 will be provided with slots 67 and this template 66 is exactly the same size as the sheet. Thus, when the template is laid on the sheet with its edges coinciding therewith, the strips of solder may be laid in the slots 67. The slots will be slightly wider and slightly longer than the strip so that the strip of solder will be easily accommodated therein. The solder strips may be coated with a flux which is quite viscous and sticky at room temperature but becomes relatively fluid when it is heated. Therefore, the flux may be heated before it is applied to both sides of the solder strips 22. Now when these flux coated strips are laid on the sheet 16 in the space provided in the template 66, they quickly cool so that the flux again becomes viscous and sticky and effectively adheres the solder strips to the sheet 16 so that they will not move out of position when the sheet is picked up and moved to the assembly station.

Figure 8:
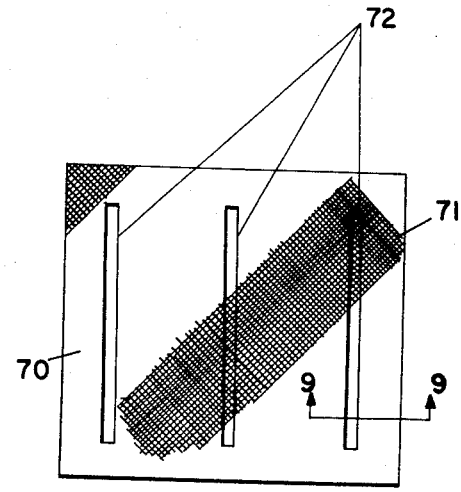
FIG. 8 is a plan view of screen for applying the solder if it is in the form of a powdered metal solder or other material susceptible to screen printing.
Figure 9:
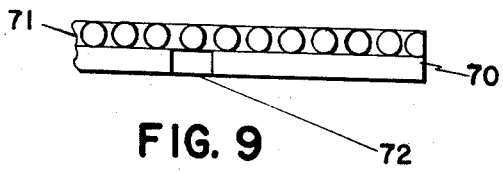
FIG. 9 is a enlarged fragmentary cross sectional view taken on the line 9—9 of FIG. 8.

If the configuration of the panel is such that the strips of solder 22 are quite long, difficulty will be encountered because of the fact that solder in ribbon form is usually characterized by camber so that it is difficult to locate it in the slot 67. Therefore, a preferred way of applying solder is by screen printing. In FIGS. 8 and 9 there is shown a screen comprising a thin sheet of metal 70 having the same width and length as the sheet 16. Slots 72 are provided through which the bonding agent is to pass and a layer of wire mesh 71 is bonded to the sheet 70. This screen is placed on the sheet 16 with the edges coinciding and a paste of solder and flux is forced through the mesh of the screen 71 where the slots 72 permit it and thus films of solder-flux paste are deposited on the sheet in proper position. It will be understood that other bonding agents which are initially in paste form may be applied to the sheet by screen printing.

It will now be clear that having applied the bonding material to the sheet 16 in a predetermined accurate position and knowing that the tubing will be accurately positioned by means of the jig 14, it is only necessary to insure that the sheet with the bonding material applied thereto will be accurately positioned at the assembly station.

The sheets which are ultimately formed into panels by a flanging operation will have the cut out corners or notches 36. For the purpose of positioning the sheet at the assembly station, locater arms 30 are provided which are secured to members 31 so that they may be adjusted, and the members 31 in turn are rotatable with the shaft 32 which is mounted in the base 33. With the locater fingers 30 in the position shown at Station A in FIG. 1, the sheet 16 is pushed against the fingers which engage in the notches 36. The fingers 30 are then rotated out of the way so that the jig 14 may be lowered. Thus, it is now assured that when the jig 14 is lowered onto the sheet bearing the bonding material 22, the tubing will be precisely located with respect to the sheet and the strips of bonding material.

As a solder there may be used a composition of 91 per cent tin and 9 per cent zinc with a flux available from Aluminum Corporation of America under the name ALCOA NO. 62. This solder may be positioned in strip or ribbon form or in the form of wire. As pointed out above, a powdered solder-flux combination may also be used. It is to be understood that the word "strip" as used in the claims is intended to cover a bonding material regardless of its nature or its specific physical form. If solder is used in the form of a ribbon, the tubing 15 lies upon the ribbon. If it is in the form of wire, the wire is laid in such manner that the tubing engages wire on one or both sides of the tubing.

In the particular example illustrated, the flat sheet member is of a thickness of 0.040 inches and is of aluminum. The tubing is of copper, having a half inch inside diameter and a wall thickness of 0.028 inches. The weight of the jig is sufficient to apply to the sheet 16 an average unit pressure of approximately 0.14 psi. The heating station is heated by any desired means so that the block 11 will attain a temperature of about 510° F. This temperature is above the melting point of the bonding material but below the melting point of the sheet and the tubing and of course the belt. It may be desirable at the heating station to increase the unit pressure to about 0.65 psi by placing additional weight on top of the jig. With the type of solder described, the assembly is held at Station B for approximately 3 minutes. The bonding agent will form fillets between the tubing and sheet on both sides of the tubing as clearly seen in FIG. 6. If the solder is in wire form, the tubing is of course pressed against the sheet rather than on top of the ribbon and when the solder melts it flows in and forms fillets on both sides of the tubing in the same way. Good wetting can be obtained and the assembly will be ready for cooling after about 3 minutes.

It is critically important to control the temperature at which the bonding material is cooled in order to avoid wrinkling or distortion of the sheet 16. There is a maximum difference in temperature between the heating block 11 and the cooling blocks 10 and 12 beyond which distortion or wrinkling of the sheet 16 will probably be experienced. This maximum difference must be determined for each combination of sheet material and thickness, and tubing material and size. Actually, therefore, the stations A and C are also heating stations in that the blocks 10 and 12 are heated. For the particular conditions herein described, they are heated to a temperature of about 300° F. With the particular solder and materials described herein, the solder will solidify in approximately 2 minutes with blocks 10 or 12 at stations A or C at a temperature of about 300° F. At this time, the solder will have developed sufficient physical properties that the assembly 14C may be removed from the machine. Before removal, of course, the members 64 will be withdrawn.

It will be noted that from the time the jig is assembled over the sheet, the sheet 16 is tightly confined over its entire area except for the grooves 20, between the bottom face of the non-metallic block 19 and the top face of the belt 13, which in turn is supported on the top faces of the blocks 10, 11 and 12 successively. The tube 15 is maintained tightly in contact with the sheet 16 by the springs or the resilient strips 21.

The arrangement of FIG. 1 is advantageous because of the time factors involved. Thus, while one assembly is at the heating station B, a previously heated assembly may be at the cooling station at C, while another assembly is being prepared at station A. When the belt 13 moves to the right, that assembly which has been heated at B will be moved to C for cooling and since the cooling cycle takes only about two minutes, a new assembly can then be placed at C so that when the belt moves back toward the left, the new assembly will move to the heating station B while the just heated assembly will move to the cooling station at A. Obviously, this greatly increases the productive capacity of the machine.

The practice of the invention as herein described will produce an excellent joint bond from the mechanical standpoint and from the heat transfer standpoint, and the aluminum sheet will retain its high degree of flatness without distortion. If there should be a departure from flatness as the assembly cools down to room temperature due to the difference in thermal coefficient of expansion between sheet and tube, such departure from flatness will take the form of a long radius uniform camber in one direction which can be removed later by a simple straightening operation so as to leave the sheet substantially flat without wrinkles, undulations or other evidence of localized distortion.

It will be understood that while the invention has been described particularly with respect to bonding tubing to a sheet, it is also adaptable to the securing of any sort of stiffening elements of the same or different metal to one face of a sheet where it is desired to maintain the flatness of the sheet.

It will be understood that various modifications may be made and that no limitation not specifically set forth in the claims is intended or should be implied.

The embodiments of the invention in which an exclusive property or privilege is claimed are defined as follows:

1. An apparatus for joining metallic tubing to a flat metal sheet, comprising an assembly station, a heating station, and a cooling station, each station including a metallic plate of a material which will not distort at temperatures to which it is respectively subjected, said metallic plates having flat upper surfaces disposed in a row in a common horizontal plane, a belt of metal having good heat conductive properties disposed to pass over said plates, in heat exchange relation thereto, between said stations, means for moving said belt with respect to said assembly, heating and cooling stations, means for heating the plate at said heating station to a joining temperature, means for heating the plate at said cooling station to a lesser temperature, and a jig for location said tubing with respect to said sheet, and for holding the tube and sheet in properly assembled relation during the heating and cooling operations.

2. An apparatus according to claim 1, wherein means are provided at said assembly and cooling station for raising and lowering said jig, said jig being releasably secured to said raising and lowering means.

3. Apparatus according to claim 2, wherein said assembly and cooling station are one.

4. Apparatus according to claim 3, wherein there is an assembly and cooling station on each side of said heating station, each of said assembly and cooling stations having raising and lowering means for a jig, and means to move said belt back and forth, whereby while a tube and sheet are being heated at said heating station another assembly of a tube and sheet may be cooled at one of said assembly and cooling stations and a new assembly of a sheet and tube may be assembled at the other of said assembly and cooling station.

* * * * *

UNITED STATES PATENT OFFICE
CERTIFICATE OF CORRECTION

Patent No. 3,703,758     Dated November 28, 1972

Inventor(s) Edward G. Beck Jr.

It is certified that error appears in the above-identified patent and that said Letters Patent are hereby corrected as shown below:

The assignee should be listed as - THE STOLLE CORPORATION, of Sidney, Ohio-.

Signed and sealed this 25th day of December 1973.

(SEAL)
Attest:

EDWARD M. FLETCHER, JR.
Attesting Officer

RENE D. TEGTMEYER
Acting Commissioner of Patents